(No Model.)
W. MILLSPAUGH.
HAY SHEARS.
No. 296,036. Patented Apr. 1, 1884.
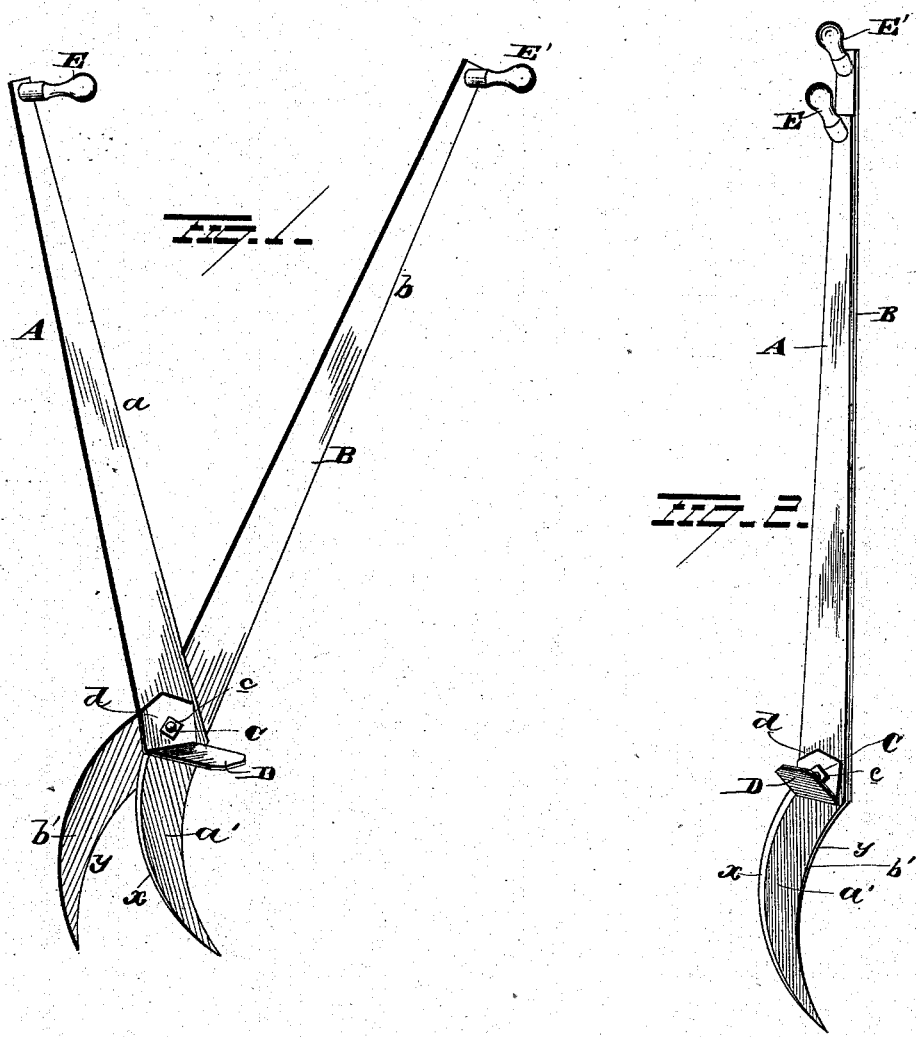

United States Patent Office.

WILLIAM MILLSPAUGH, OF MIDDLETOWN, NEW YORK.

HAY-SHEARS.

SPECIFICATION forming part of Letters Patent No. 296,036, dated April 1, 1884.

Application filed December 6, 1883. (No model.)

*To all whom it may concern:*

Be it known that I, WILLIAM MILLSPAUGH, of Middletown, in the county of Orange and State of New York, have invented a certain new and useful Improvement in Hay-Shears; and I do hereby declare the following to be a full, clear, and exact description of the invention, such as will enable others skilled in the art to which it appertains to make and use the same.

My invention relates to an improvement in hay-knives, the object being to provide a machine which will cut hay from a mow or stack rapidly and easily, and which is durable and cheap.

With these ends in view my invention consists in a pair of shears having curved blades, and provided with a device for pressing the blades into the mow or stack by the foot, and with handles attached to the levers, whereby the shears are conveniently operated.

My invention further consists in certain features of construction and combinations of parts, as will be fully described, and pointed out in the claim.

In the accompanying drawings, Figure 1 is a view of the shears open, and Fig. 2 represents the same when closed.

A represents a flat steel bar. About two-thirds the length of this bar is straight and gradually increases in breadth toward the blade, and the remaining third, $a'$, is curved, as shown, and gradually tapers to a point. The curved portion $a'$ is beveled to a knife-edge, $x$, on its convex edge.

B represents a flat steel bar similar in shape to the bar A, just described, with the following exceptions: The straight part $b$ is a few inches longer, and the curved portion $b'$ is beveled to a knife-edge, $y$, on the concave edge. These two flat bars A and B are held in contact by the pivotal bolt C, which passes through them near the beginning of the curved portions, and the convex edge of the bar A is thus caused to engage the concave edge of the bar B as the shears open and close. The laterally-projecting step D is mounted upon the pivotal bolt C by a perforation through the shoulder $d$, adapted to receive the bolt, and is secured in position by the nut $c$ on the end of the said bolt. Each of the lever-bars A and B is provided with a laterally-extending handle, E and E′, near the end, by means of which the levers are operated. The bar B being somewhat longer than the bar A admits of the bar A passing the bar B, the handle E passing under the handle E′. The blades of the shears are forced into the mow or stack by the pressure of the foot on the step D. The operator, standing in front and having hold of the handles E and E′, opens the blades, presses them into the mow by his foot on the step D, and then closes the blades, thus making a clean cut to the depth of the blade's length. The step D, furthermore, not only affords the means of pressing the blades into the hay, but serves to press the loose hay on the surface down to a position where the blades will engage it, and thus prevents clogging. The length of the shears is conveniently about three feet. They may, however, be made longer or shorter, as the circumstances require.

I have spoken of the bars A and B as flat and made of steel. I do not wish to be understood as limiting the construction to this shape and material, as the bars might be made half oval or other suitable shape in cross-section, and the material might be iron or any other suitable material, provided the blades have steel cutting-edges. Again, the blades are not necessarily curved, as represented, but may be nearly or quite straight, the curve represented being that which gives the best results in a machine of convenient size.

Having fully described my invention, what I claim as new, and desire to secure by Letters Patent, is—

Hay-shears consisting, essentially, of two blades pivoted together, hand-levers secured to the blades, and a step depending from the pivotal bolt which secures the blades together, substantially as set forth.

In testimony whereof I have signed this specification in the presence of two subscribing witnesses.

WM. MILLSPAUGH.

Witnesses:
W. K. STANSBURY,
C. I. HUMPHREY.